United States Patent [19]
Sakakida et al.

[11] Patent Number: 5,195,776
[45] Date of Patent: Mar. 23, 1993

[54] AIR BAG INSTALLATION

[75] Inventors: Masafumi Sakakida; Haruhiro Inada, both of Hiroshima; Hisao Muramoto, Yamaguchi, all of Japan

[73] Assignee: Mazda Motor Corporation, Hiroshima, Japan

[21] Appl. No.: 675,523

[22] Filed: Mar. 26, 1991

[30] Foreign Application Priority Data

Mar. 27, 1990 [JP] Japan .................... 2-75518
Mar. 28, 1990 [JP] Japan .................... 2-81732
Dec. 17, 1990 [JP] Japan .................... 2-411048

[51] Int. Cl.$^5$ ............................. B60R 21/16
[52] U.S. Cl. ......................... 280/732; 280/743
[58] Field of Search ............... 280/728, 731, 732, 743

[56] References Cited

U.S. PATENT DOCUMENTS

| | | | |
|---|---|---|---|
| 3,756,617 | 9/1973 | Brown | 280/732 |
| 4,759,568 | 7/1988 | Paefgen et al. | 280/732 |
| 4,834,421 | 5/1989 | Korber et al. | 280/732 |
| 4,895,389 | 1/1990 | Pack, Jr. | 280/732 |
| 4,989,896 | 2/1991 | DiSalvo et al. | 280/732 |
| 5,044,663 | 9/1991 | Seizert | 280/732 |

FOREIGN PATENT DOCUMENTS 63-258240 10/1963 Japan .
64-7055 1/1989 Japan .

Primary Examiner—Kenneth R. Rice
Attorney, Agent, or Firm—Wenderoth, Lind & Ponack

[57] ABSTRACT

An air bag assembly may have curved air bag lids that are reliably opened and that are more stiffly supported. A member which connects the lids to a casing is formed of a plastically deformable member having a bent portion. This member supports the lids on the casing with considerable stiffness. When the air bag inflates, the bent portion is plastically deformed to extend outwardly of the instrument panel. As the lids open, the member does not restrict movement to rotate about a center point.

11 Claims, 5 Drawing Sheets

AIR BAG INSTALLATION

BACKGROUND OF THE INVENTION

This invention relates to an air bag installation for a motor vehicle, more particularly to an improvement of the air bag installation for the passenger side of the motor vehicle.

It is well known that air bag assemblies have been developed as a safety system during a crash involving the motor vehicle, and already are utilized.

Such air bag assembly includes an air bag which is to be inflated by gas pressure, a crash detection sensor, and a gas generator which introduces gas into the air bag when a crash is detected. Such air bag assembly generally is mounted to the body of the vehicle as an air bag unit. The air bag units are equipped in a steering wheel for a driver side seat, and in an instrument panel through an opening therein for the passenger side seat. When a shock is generated due to a crash of the motor vehicle, the gas generator is operated by the crash detection sensor to inflate the air bag so as to protect the head and chest of a driver and passenger during forward movement thereof due to the crash.

Such air bag unit is, generally speaking, covered by a cover member called an air bag lid. The air bag lid for the air bag unit of the passenger side is comprised of an upper lid and a lower lid which are able to move in upward and downward directions and which are installed along the instrument panel surface to close the opening therein. The upper lid and lower lid are arranged to open automatically due to the pushing force inside the instrument panel from the inflation of the air bag.

In the conventional air bag unit, the air bag lids generally are mounted, for example to the instrument panel, by means of attachment members such as hinges. Japanese Utility Model Laid-Open publication No. 64-7055 discloses a attachment member comprising a plurality of plate members connected with each other by connecting shafts.

Recently, the necessity to provide good designs for front windows or windshields of motor vehicles has resulted in the instrument panels of most motor vehicles having curved configurations. For example, from a side door toward the center of a passenger compartment of a vehicle, the instrument has a curved configuration upwardly and downwardly and also frontwardly and rearwardly. In such case, the air bag lids should be shaped of a curved configuration to correspond to the shape of the instrument panel. It is difficult to use attachment members of conventional structure to attach the air bag lids to the curved instrument panel. Such problem could restrict the design flexibility of the instrument panel.

Also, conventionally, the air bag lids are constructed only integrally of plastic materials. Thus, the lids lack hardness necessary for support, and when the air bag inflates, the air bag lids could interfere with the instrument panel, thereby causing injury to both.

It is an object of the present invention to provide an improved air bag assembly whereby the air bag lids and the instrument panel are prevented from interfering with each other and whereby it is possible to ensure that the air bag lids will release properly and smoothly without injury to the lids or to the instrument panel during an opening operation, even if the air bag lids are of curved configuration corresponding to the shape of the instrument panel.

It is another object of the present invention to provide an improved air bag assembly with increased stiffness of support of the air bag lids during the normal state thereof, compared to the conventional attaching means using hinges.

SUMMARY OF THE INVENTION

These objects are achieved according to the invention by provision of an air bag assembly for a motor vehicle and comprising:

an opening formed in an instrument panel in a passenger compartment of the motor vehicle and arranged to face a passenger seat;

an air bag unit positioned inside the instrument panel and having an air bag to be inflated by a shock to extend through the opening;

an air bag lid as a cover member covering the opening of the instrument panel;

a deformable member connecting the air bag lid to a body structure of the vehicle to enable the lid to open the opening, the member having a bent portion which is positioned at a fulcrum of rotation of the air bag lid and is plastically deformable to allow the air bag lid to move outwardly due to a pushing pressure when the air bag inflates.

According to the present invention, the member with the bent portion connects the air bag lid to a member of the vehicle body. The bent portion is able to be plastically deformed to allow the air bag lid to move outwardly. Thus, when the strong pressure due to inflation of the air bag occurs, the plastic deformation of the member provides that the air bag lid will move smoothly toward the passenger seat. Therefore, even if the air bag lid has a curved shaped corresponding to the shape of the instrument panel, interference between the air bag lid and the instrument panel is prevented, and appropriate movement of the lid is achieved without injury to the lid or to the instrument panel.

Furthermore, as the member is made from a plastically deformable material, for example, sheet metal, strength of support of the air bag lid in the normal state thereof is much improved compared with the conventional attachment member structure such as hinges.

DETAILED DESCRIPTION OF THE PREFERRED EMBODIMENTS

Figure 1:
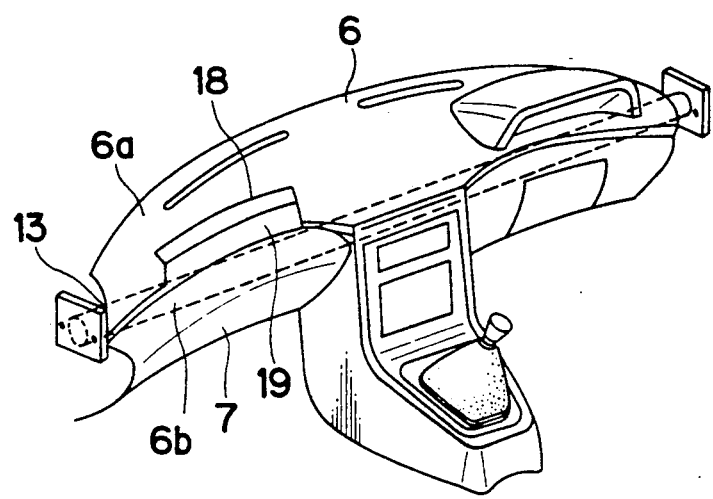
FIG. 1 is a perspective view of an instrument panel in a motor vehicle of an embodiment of the present invention.
Figure 2:
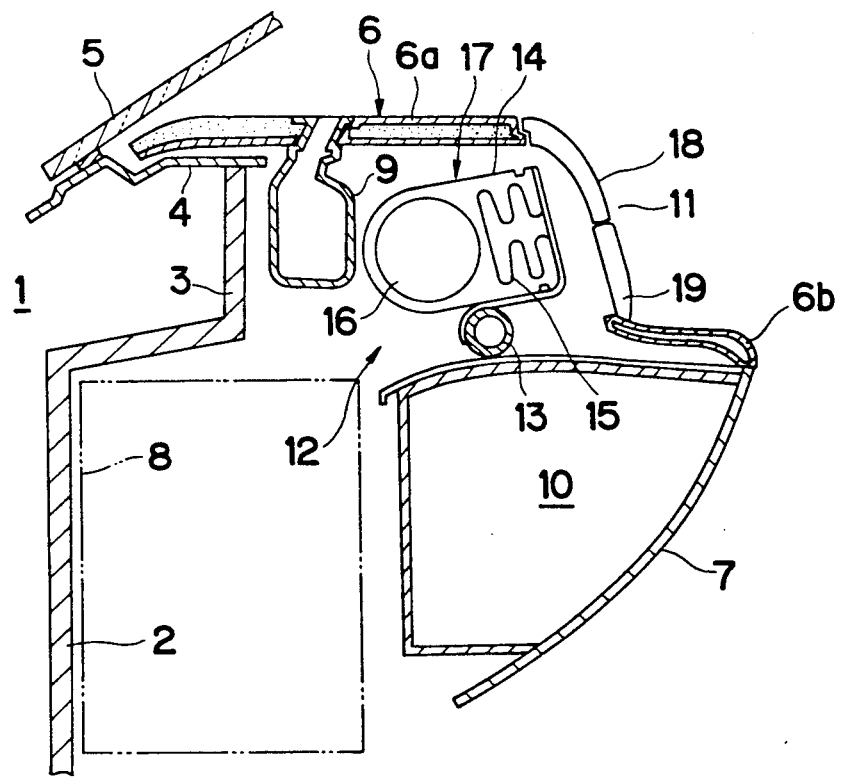
FIG. 2 is a cross sectional view of the instrument panel for a passenger seat.

Embodiments of the present invention will now be described in detail with reference to the drawings. FIG. 1 and FIG. 2 show part of a vehicle body structure in which is mounted an air bag assembly. An upper dash panel 3 is joined on the upper end of a lower dash panel 2 which is arranged at the rear end of an engine compartment 1, and an upper cowl panel 4 is joined to the upper end of the upper dash panel 3. A front window glass 5 is fixed on a portion of the upper cowl panel 4. An instrument panel 6 has a top deck portion 6a covering the upper cowl panel 4 and a side wall portion 6b which descends rearwardly in a curved configuration from a rear end of the top deck portion 6a. A glove compartment lid 7 is mounted at a lower end portion of the side wall portion 6b. Inside of the instrument panel 6 are positioned a cleaning unit 8 for an air conditional and a defrost nozzle 9 for preventing fogging of the front window glass 5, and inside of the lid 7 is provided a compartment pocket 10.

In a portion of the instrument panel 6 which faces toward a passenger seat is provided a long and narrow opening 11 extending in the width direction of the vehicle body. Inwardly of the opening within panel 6 is positioned an air bag assembly 12 supported on a steering support member 13. The air bag assembly 12 includes an air bag unit 17 having a casing 14 connected to the vehicle body structure and fixed to the steering support member 13 and open rearwardly. An air bag 15 is folded and enclosed in the casing 14. A gas generator 16 generates gas to be introduced into the air bag 15 in response to a shock detection sensor. The opening 11 of the instrument panel 6 is located rearwardly of the air bag unit 17 and is closed by an air bag lid as a cover member, for example, an upper lid 18 and a lower lid 19 which are openable upwardly and downwardly, respectively, toward a passenger seat. As shown in FIG. 1, lids 18, 19 have a widthwise configuration that is curved to correspond to the curve of instrument panel 6. Upper lid 18 has an upper, forwardly facing end, and an edge of such end confronts an edge of a rearwardly facing end of top deck portion 6a. Side wall portion 6b extends rearwardly and downwardly from a forward and upper end thereof. Lower lid 19 has a lower end that faces downwardly, and an edge of such end confronts an edge of the forward and upper end of side wall portion 6b.

Figure 3:
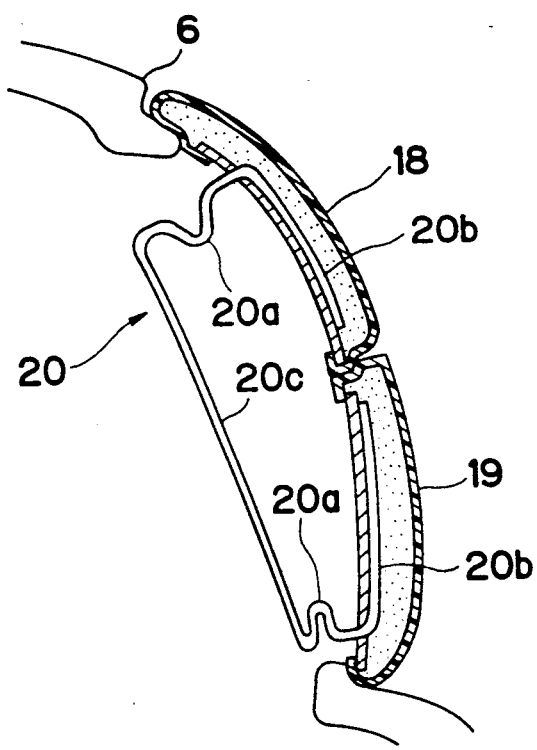
FIG. 3 is a detailed cross sectional view of part of an air bag assembly.
Figure 4:
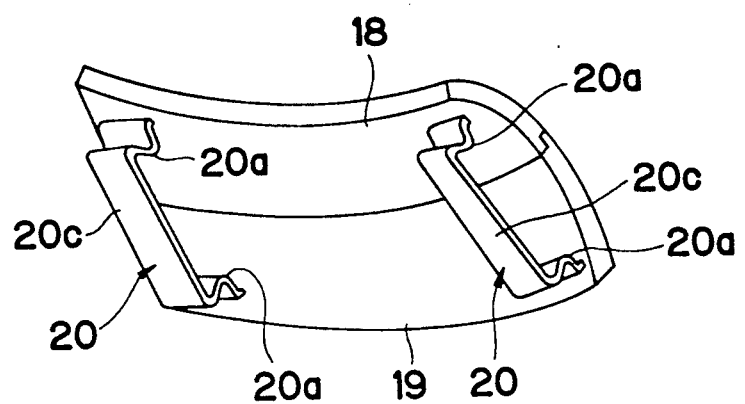
FIG. 4 is a perspective view of part of the air bag assembly.
Figure 5:
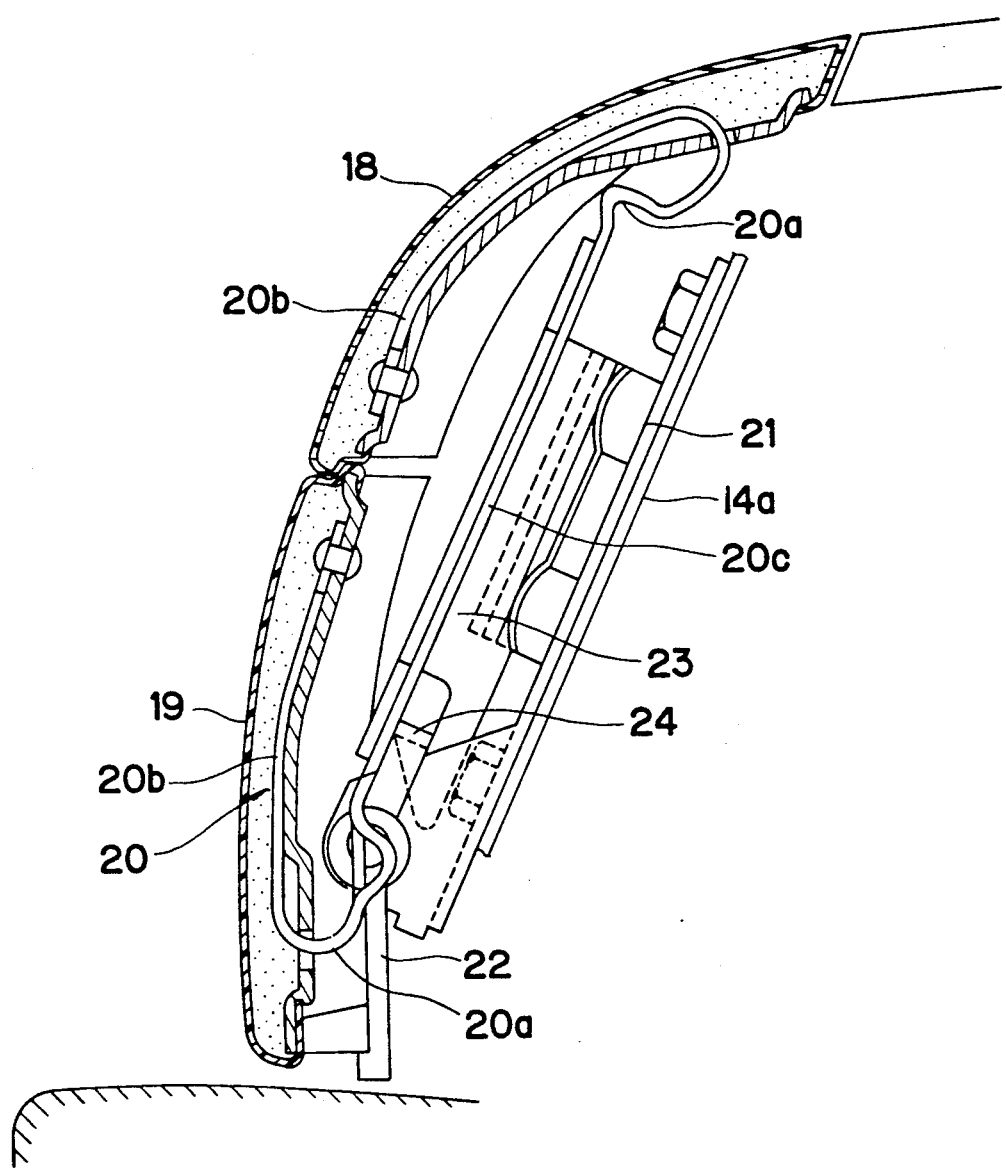
FIG. 5 is a cross sectional view of part of another air bag assembly and showing mounting thereof in an instrument panel.

FIG. 3 through FIG. 5 show the air bag assembly 12 in detail. According to this embodiment, the upper and lower lids 18, 19 and the casing 14 are connected by belt-shaped deformable or plastic members 20 such as iron straps having bent portions 20a. When the lids 18, 19 are opened by inflation of the air bag 15, the bent portions 20a are extended by plastic deformation to allow the lids 18, 19 to move rearwardly outwardly.

In more detail, embedded in the upper lid 18 and the lower lid 19 are metal core members 20b that comprise opposite ends of each of the members 20. At portions of each member 20 adjacent to the upper end portion of the upper lid 18 and the lower end portion of the lower lid 19 are formed the tang-shaped bent portions 20a which are folded into a U-shaped cross section and are formed integrally with the member 20. Toward the backsides of lids 18, 19 and from the bent portions 20a is an attaching portion 20c. The attaching portion 20c is mounted to the casing 14 so that the lids 18, 19 are supported on the casing 14. At opposite left and right ends of the casing 14 are formed respective flange portions 14a to which is fixed a longitudinal channel-shaped guide member 21. At a lower end portion of the guide member 21 is provided lock member 22 comprising a turning lever. Fixed to the attaching portions 20c of the members 20 is an engagement member 23 engaging with the guide member 21. At a lower end portion of the engagement member 23 is a projection 24 to hold lock member 22. By joining the guide member 21 to the engagement member 23 and engaging the lock member 22 with the projection 24, the members 20 are attached to the flange portions 14a of the casing 14, to be attached thereto or detached therefrom.

Functioning of this embodiment now will be described, also referring to FIG. 6. Normally, as shown in FIG. 3, the upper lid 18 and the lower lid 19 are arranged to close the opening 11 of the instrument panel 6. The members 20 having core members 20b embedded in the upper and lower lids 18, 19 and the attaching portions 20c exposed from the lids 18, 19 are attached to the casing 14 that is a vehicle body member. Thus, the strength or stiffness of support of the upper and lower lids 18, 19 is improved by the members 20 formed on sheet metal. As a result, the lids 18, 19 are not unsteady but are held and supported stably at the opening 11 of the instrument panel 6.

Figure 6:
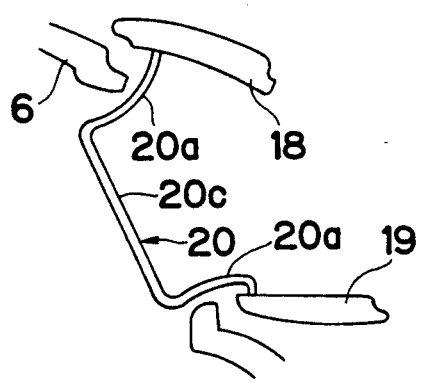
FIG. 6 is a schematic view of part of an air bag assembly which shows operation upon opening of air bag lids.

On the other hand, when an impact or shock occurs, as shown in FIG. 6, the upper lid 18 and the lower lid 19 are pushed outwardly by inflation of the air bag 16 causing the air bag to expand rearwardly from inside of the instrument panel 6. At such time, the lids 18, 19 may leave the opening 11 of the instrument panel 6 to some extent due to deformation of the bent portions 20a. However, the lids 18, 19 remain fixed by members 20 to casing 14 and thus the vehicle body. Therefore, the lids 18, 19 rotate in upward and downward directions relative to the instrument panel 6, thus preventing a passenger in the passenger seat from being injured.

Therefore, comparing this embodiment with the conventional structure using an attachment member such a hinge, the latitude of design flexibility of the instrument panel 6 has been increased, and the lids 18, 19 are opened appropriately at the instant when an impact or crash occurs, while when the lids are closed the stiffness or strength of support of the lids 18, 19 is increased.

According to this embodiment, the fulcrums of rotation of the upper lid 18 and the lower lid 19 are connected to the casing 14 by the members 20, even if the lids are shaped in forms having curvatures corresponding to the instrument panel 6. Interference between the air bag lids 18, 19 will open properly without injury either to the air bag lids 18, 19 or to the instrument panel 6, and in the closed condition, the stiffness of support of the upper lid 18 and the lower lid 19 at the opening 11 is improved.

Figure 7:
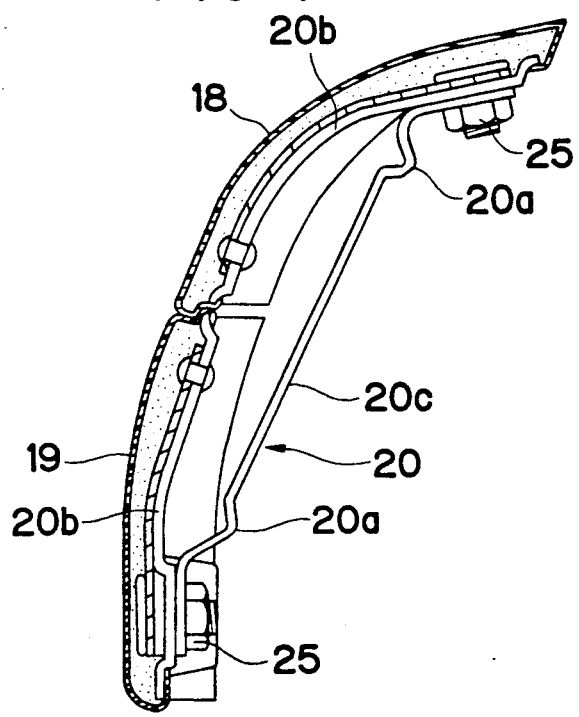
FIG. 7 is a cross sectional view of a plastic or deformable member of another embodiment of the present invention.

In the above embodiment, member 20 is comprised of the bent portions 20a, the core member 20b and the attaching portion 20c that are formed integrally. However, as shown in FIG. 7, the core members 20 may be formed separately from the bent portions 20a and the attaching portion 20c and may be connected thereto by fasteners 25.

Figure 8:
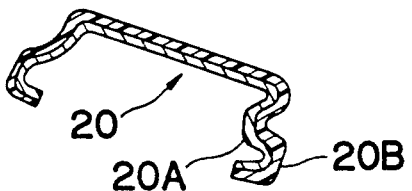
FIG. 8 is a sectional view of the deformable member of a further embodiment of the present invention.

According to the above embodiments, the member 20 is comprised of a monolithic material such as sheet metal or the like. However, as shown in FIG. 8, the member may be comprised of a cloth belt portion 20A and a plastic coating portion 20B superposed and stuck to each other.

Furthermore, in the above embodiments, the air bag lid is provided as the upper lid 18 and the lower lid 19 which are openable in upward and downward directions, respectively. However, the scope of the invention is not limited to such embodiment. The invention may be applied to other lid structure, such as one-plate air bag lid, or a pair of lids openable in leftward and rightward directions, and so on.

Figure 9:
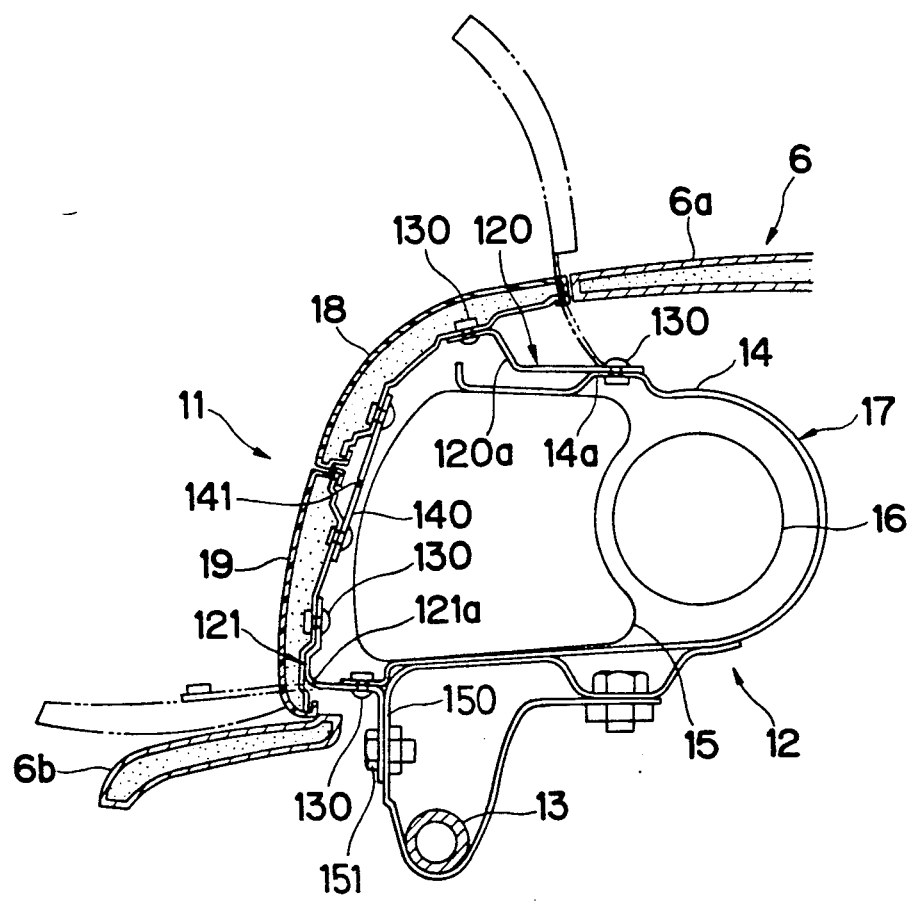
FIG. 9 is a cross sectional view of a further embodiment of the present invention and which shows the instrument panel for the passenger seat.

FIG. 9 discloses another embodiment. An air bag assembly 12 of this embodiment provides that each lid 18, 19 is connected to the casing 14, as a vehicle body member, by respective deformable or elastic members 120, 12 with bent portions 120a, 121a. When the lids 18, 19 are released, the bent portions 120a, 121a are plastically deformed and extended, to allow the lids 18, 19 to move outwardly. In more detail, opposite ends of the member 120 which connects the upper lid 18 to the casing 14 are joined by respective pins 130 to the back side of the upper lid 18 and to a step portion 14a formed at the upper side of the casing 14. The bent portion 120a of the member 120 is positioned remotely at a distance from the top deck portion 6a of the instrument panel 6. That is, member 120 extends from the step portion 14a of the casing 14 toward the upper lid 18 generally parallel to the top deck portion 6a, and the bent portion 120a extends upwardly to the upper lid 18 at a position rearwardly beyond the top deck portion 6a. According to this structure wherein the bent portion 120a is as remote as possible from the top deck portion 6a, the member 120 extended by operation of opening the upper lid 18 will not interfere with the top deck portion 6a thereby ensuring smooth opening of the upper lid 18.

On the other hand, opposite ends of the other member 121 which connects the lower lid 19 to the casing 14, are joined by respective pins 130 to the back side of the lower lid 19 and to the lower front edge of the casing 14. Member 121 is L-shaped as a whole and includes the bent portion 121a. The member 121 is deformed sc that the bent portion 121a will extend along the side wall portion 6b approximately horizontally upon an operation of opening the lower lid 19.

Furthermore, according to this embodiment, the lower end portion of the upper lid 18 and the upper end portion of the lower lid 19 are connected with each other by means of a connection member 140. The connection member 140 is formed as a plate along the width of the vehicle body and extends between and along the back sides of the upper lid 18 and the lower lid 19. Particularly, the connection member 140 has a groove 141 at a position where the upper lid 18 and the lower lid 19 confront each other. This groove 141 makes such position weaker than the other portions of the connection member 140. Use of such connection member 140 improves fitting and assembly of the upper lid 18 and the lower lid 19. That is, during assembly misplacement or misalignment of the lids is prevented and appearance is improved. Also, the stiffness of support of the lids 18, 19 to the casing 14 is improved. When the lids 18, 19 open, the connection member 140 easily is broken at the groove 141 and the lids 18, 19 are released smoothly.

Furthermore, as shown in FIG. 9, the member 120 is connected at opposite ends thereof to the upper lid 18 and the casing 14 by the pins 130, so that the upper lid 18 is fixed to the casing 14 as a vehicle body member. The member 121 is connected to the lower lid 19 and to the casing 14 by pins 130 and also a supporting member 150 fixed to the steering support member 13 by a bolt 151. Thus, the lower lid 19 is fixed directly to the supporting member 150 that is part of the vehicle body structure. As the result, the upper and lower lids 18, 19 both are secured to members or parts of the vehicle body structure and are prevented from leaving the instrument panel 6 even when an impact force due to inflation of the air bag 15 acts on the back sides of the lids 18, 19.

On the other hand, the side wall portion 6b of the instrument panel 6 is inclined rearwardly downwardly so that objects such as bags and the like cannot be placed on the side wall portion 6b, thereby ensuring that an opening operation of the lids 18, 19 always can be achieved without interference. Of course, this embodiment ensures the same effects as in the former embodiments.

According to the above embodiments, the deformable members having bent portions connect air bag lids to the vehicle body structure, and when the lids open the bent portions of the members are plastically deformed and extended to allow the air bag lids to move outwardly. Thereby, when the inflating air bag acts strongly to push the air bag lids outwardly, due to the plastic deformation of the members the air bag lids are smoothly released in directions toward the passenger seat. Even if the air bag lids are of curved configurations corresponding to the shape of the instrument panel, the construction of the invention prevents the air bag lids and the instrument panel from interfering with each other and ensures the release of the air bag lids properly and smoothly without injury to either during an operation. Furthermore, the stiffness of support of the air bag lids in a normal state is increased compared to conventional attaching means using hinges.

While preferred embodiments of this invention have been described and illustrated, it should be understood that modifications are possible without departing from the spirit and scope of this invention as defined by the appended claims.

We claim:

1. An installation for providing air bag protection for a passenger side of a motor vehicle, said installation comprising:

an instrument panel having therein an opening directed toward the passenger side, said instrument panel including an upper portion and a lower portion, said upper portion having a rearwardly facing end defining an upper edge of said opening, and said lower portion extending rearwardly and downwardly from a forwardly facing end thereof defining a lower edge of said opening;

an upper lid and a lower lid mounted in a position to close said opening in a normal condition, said upper and lower lids having respective confronting lower and upper ends, said upper lid having an upper, forwardly facing end confronting an edge of said rearwardly facing end of said upper portion of said instrument panel, and said lower lid having a downwardly directed lower end having an edge confronting an edge of said forwardly facing end of said lower portion of said instrument panel;

an air bag unit mounted forwardly of said opening in said instrument panel and including an air bag operable, upon the occurrence of a shock imparted to the motor vehicle, to be inflated to expand rearwardly through said opening and to move said upper and lower lids from said position closing said opening; and at least one mounting member connected to a body member of the motor vehicle and connected to said upper and lower lids to mount said upper and lower lids in said position closing said opening, said mounting member having respective bent portions that are plastically deformable to cause, upon inflation of said air bag, said upper and lower lids to move rearwardly away from said opening and to pivot respectively upwardly and downwardly about respective fulcrums without interference with said upper and lower portions, respectively, of said instrument panel.

2. An installation as claimed in claim 1, wherein said member comprises an integral one-piece structure having at opposite ends thereof core portions embedded in respective said lids, said respective bent portions being positioned forwardly of respective said core portions and integral therewith, and an attaching portion integral with and joining said bent portions and connected to said body member of the motor vehicle.

3. An installation as claimed in claim 2, wherein said bent portions are U-shaped.

4. An installation as claimed in claim 3, wherein U-shaped bends of said bent portions are directed toward each other.

5. An installation as claimed in claim 1, wherein said member comprises respective core portions embedded in respective said lids, and an attaching portion having at opposite ends thereof said bent portions and being connected to said body member, said attaching portion being connected to said core portions.

6. An installation as claimed in claim 1, wherein said member comprises a first part connected to a first said lid and to said body member, and a second part connected to a second said lid and to another body member separate from and connected to said body member.

7. An installation as claimed in claim 1, wherein said member comprises a cloth belt portion superimposed over and rigidly secured to a plastic coating portion.

8. An installation as claimed in claim 1, wherein a first said bent portion is positioned at a location spaced rearwardly of said rearwardly facing end of said upper portion of said instrument panel.

9. An installation as claimed in claim 1, further comprising a connection member bridging said lower and upper ends of said upper and lower lids when in said position covering said opening and capable of being ruptured upon inflation of said air bag.

10. An installation as claimed in claim 1, wherein said instrument panel has a configuration curved in a widthwise direction, in a vertical direction and in a rearward direction, and said lids have curved configurations to substantially conform to said instrument panel configuration.

11. An installation as claimed in claim 1, wherein said air bag unit further includes a casing having an open rear end directed toward said opening and housing therein said air bag, and said member is connected to said casing.

* * * * *